G. PADDINGTON.
Corn Planter

Patented Dec. 6, 1870

Witnesses.

Inventor.

G. PADDINGTON.
Corn Planter.

No. 109,837. Patented Dec. 6, 1870.

Witnesses.

Inventor.
George Paddington
by Prindle & Dyer
Attys.

United States Patent Office.

GEORGE PADDINGTON, OF WAUBECK, IOWA.

Letters Patent No. 109,837, dated December 6, 1870.

IMPROVEMENT IN CORN-PLANTERS.

The Schedule referred to in these Letters Patent and making part of the same.

*To whom it may concern:*

Be it known that I, GEORGE PADDINGTON, of Waubeck, in the county of Linn and State of Iowa, have invented a new and useful Improvement in Corn-Planters; and I do declare that the following is a true and accurate description thereof, reference being had to the accompanying drawing and to the letters of reference marked thereon and being a part of this specification, in which—

Figure 1 is a plan, shown in sheet 1.

Figure 2, a vertical section, on the line $x$ $x$ in fig. 1, shown in sheet 2, with following figures.

Figure 3, a bottom plan of the rotating harrows.

Figure 4, an elevation of the same.

Figure 6, a plan of the plates and connections between the same, which carry the furrow-openers, and stationary harrows for leveling off the ground.

Like letters indicate like parts in each figure.

The nature of this invention relates to an improvement in that class of implements employed for planting corn, and consists in the peculiar arrangement of two rotating harrows, to pulverize the ground preparatory to being opened by the shares or furrow-openers; also, in a novel device for marking the ground where planted; and in the combination of the various parts composing the whole machine, which is designed more especially to be an improvement upon a similar apparatus heretofore secured to me by Letters Patent.

In the accompanying drawing—

A is a frame, to which is journaled an axle, B, to which the traction-wheels C are rigidly attached.

D is another smaller frame, secured to and under the rear end of the frame A, by means of bolts and nuts E, in such a manner that it may be adjusted to varying heights.

An axle, F, is journaled to this frame D, to which are rigidly secured wheels G, upon which the rear end of the device travels.

H is a plate, the rear end of which is pivoted to the frame D, and it is provided with a caster-wheel, I, and lever, J, by means of which the rear end of the device is lifted from the wheels G, and thrown upon the caster-wheel, to facilitate turning at the end of the rows.

K are rotary harrows, secured to the lower ends of the shafts L, which are vertically journaled to the front of the frame A.

Figure 1:
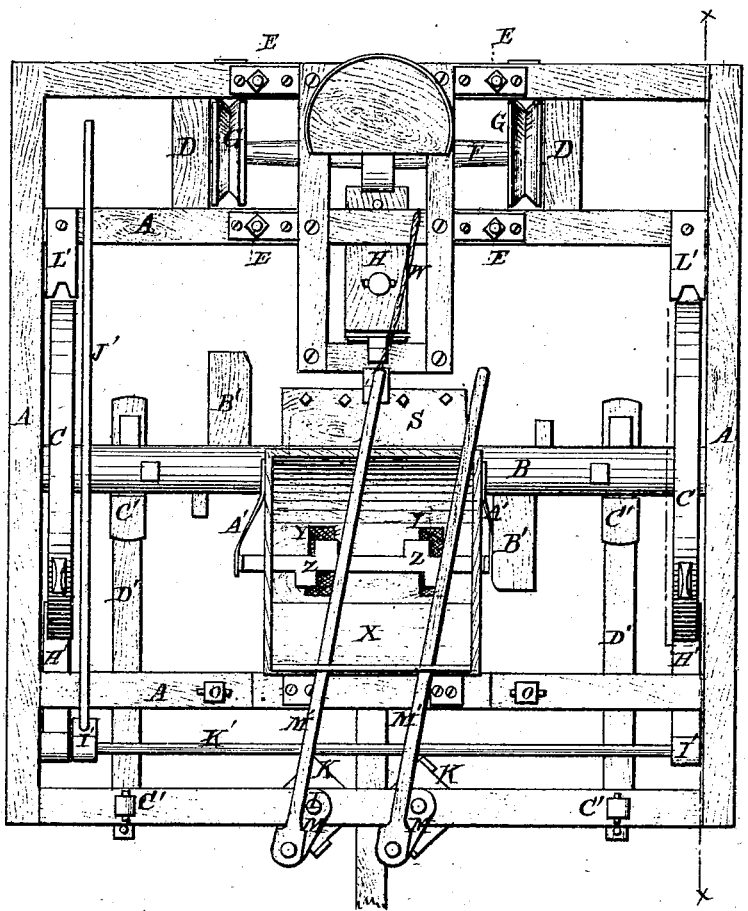
Figure 2:
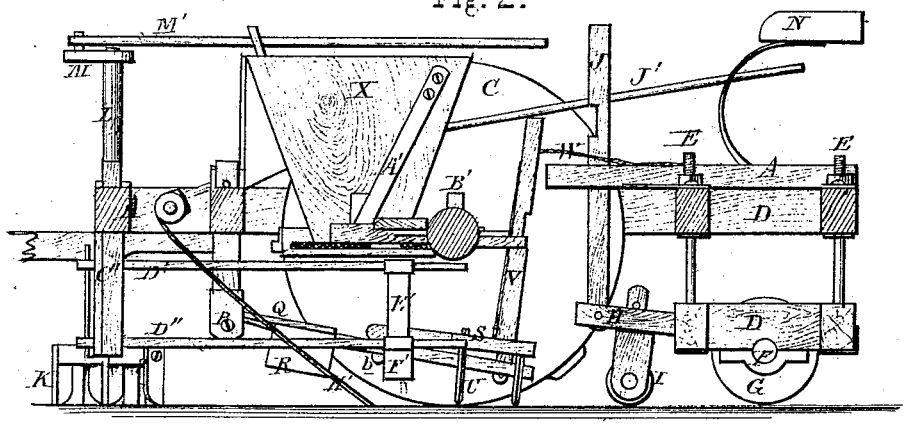
Figure 3:
Figure 6:
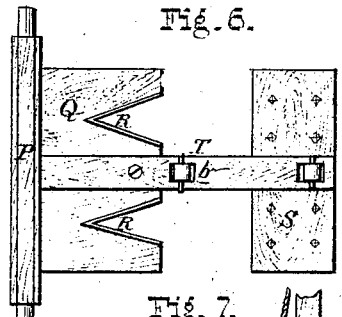
Figure 4:
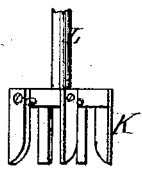
Figure 7:
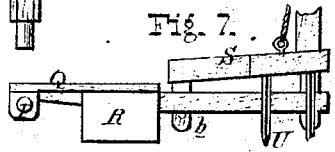
Figure 7 is an elevation of the same.
Figure 8:
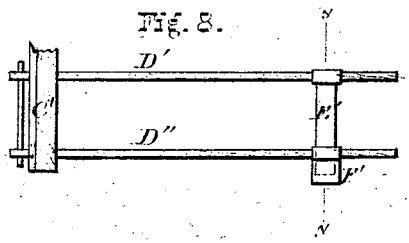
Figure 8 is a sectional elevation of the markers.
Figure 9:
Figure 9 is a vertical section of the same, on the line $y$ $y$ in fig. 8.

The teeth of these harrows are constructed in the form shown at $a$ in figs. 3 and 4, and, in the forward motion of the machine, will rotate and thoroughly pulverize the earth in front of the furrow-openers or shares.

To the upper end of these shafts L are secured cranks M and handles M', which lead back toward the driver's seat N, and by means of said handles and cranks the driver may compel the harrows to again commence rotating when by any accident they may have been stopped.

Pivoted to the hangers O, which are secured to the frame A, is the rod P, to which is fastened the plate Q, to which, in turn, are secured the V-shaped shares or furrow-openers R, immediately in rear of and in line with the center of the rotary harrows K.

To this plate Q the plate S is connected by the strap T, which is pivoted to the prolongation of the plate Q at $b$.

To the plate S are fastened harrow-teeth U, which are designed to level the furrows made by the shares R.

A rod, V, pivoted to the rear end of the plate S and to the prolongation of the plate Q, extends upward, and is provided with a handle or cord, W, by means of which the driver may, when desired, lift the harrow and shares free from the ground.

A hopper, X, for holding the seed, is secured to the frame A, and is provided with suitable openings, Y, in its bottom, through which the seed drops into the furrows opened by the shares R.

Slides Z, which have a reciprocating motion, control the amount of seed to be dropped.

The ends of these slides project through the ends of the hopper, and there engage with the springs A', which, in turn, engage with the cams B', which are secured to the axle B, and in its rotation give the reciprocating motion, above mentioned, to the slides Z.

To the hangers C', which are secured to and suspended below the front end of the frame A, are secured the spring-bars D' D'', the opposite ends of which terminate under the axle A.

These spring-bars are rigidly secured to the hangers, and the bar D' is provided with a long tooth, E', projecting downward between two teeth, F', which are secured to the bar D''

These teeth are to mark the ground opposite the outer hill or row, and are forced into the ground, at the proper time, by means of the gauge G', which is so secured to the axle A that it may be adjusted to compel the teeth to enter the ground at a greater or lesser depth.

As soon as the gauge, in the continued rotation of the axle, has passed the ends of the bars, they spring to their original position, withdrawing the teeth from the ground.

K' is a rod extending across the front of the frame, and journaled at I', at either end.

To this rod are secured the spring-scrapers H', which are designed to remove obstructions from before the wheels O; and L' are stationary scrapers, secured to the frame, in rear of said wheels, to free them from soil.

What I claim as my invention, and desire to secure by Letters Patent, is—

1. The combination of the harrows K, constructed as described and shown, the vertical shaft L, cranks M, handle M', and frame A, all arranged as and for the purposes set forth.

2. The arrangement, with the frame A, of the hangers C', spring-bars D' D" provided with marking-teeth E' F', when said spring-bars are operated with the gauge G', secured to the axle A, as set forth.

GEORGE PADDINGTON.

Witnesses:
J. M. WALKER,
EDWARD BARKLEY.